United States Patent [19]
Valentine

[11] Patent Number: 5,815,808
[45] Date of Patent: Sep. 29, 1998

[54] LOCATION BASED SCREENING IN A MOBILE TELECOMMUNICATIONS SYSTEM

[75] Inventor: Eric Lee Valentine, Plano, Tex.

[73] Assignee: Ericsson Inc., Research Triangle Park, N.C.

[21] Appl. No.: 604,097

[22] Filed: Feb. 20, 1996

[51] Int. Cl.$^6$ .............................. H04Q 7/24; H04M 1/64
[52] U.S. Cl. .................... 455/422; 455/414; 455/415; 455/422; 455/435; 379/207; 379/196
[58] Field of Search ..................................... 455/414, 415, 455/422, 435, 445, 436, 456, 565, 567, 461, 459, 432; 379/207, 196

[56] References Cited

U.S. PATENT DOCUMENTS

| | | | |
|---|---|---|---|
| 5,200,995 | 4/1993 | Gaukel et al. | 379/200 |
| 5,467,388 | 11/1995 | Redd, Jr. et al. | 379/196 |
| 5,471,519 | 11/1995 | Howe et al. | 379/67 |
| 5,473,671 | 12/1995 | Partridge, III | 379/59 |

FOREIGN PATENT DOCUMENTS

| | | |
|---|---|---|
| 0676884 | 3/1994 | European Pat. Off. . |
| 9318606 | 9/1993 | WIPO . |

*Primary Examiner*—William Cumming
*Assistant Examiner*—Jean A. Gelin
*Attorney, Agent, or Firm*—Jenkens & Gilchrist

[57] ABSTRACT

A screening list for a specific location within a mobile telecommunications system is assigned to a mobile subscriber. If the mobile subscriber is served by a Mobile Switching Center of that location, all originating and terminating calls are screened against the allowed directory numbers that have been stored in the screening list. If there is a match, telecommunications service is selectively provided. Otherwise, access is denied. A single mobile station can have separate screening lists for different locations within a mobile telecommunications system. Accordingly, a different screening list can be assigned to a Local Access and Transport Area, Network Area, Location Area and Cell Area within a mobile telecommunications system.

26 Claims, 10 Drawing Sheets

LOCATION BASED SCREENING IN A MOBILE TELECOMMUNICATIONS SYSTEM

BACKGROUND OF THE INVENTION

1. Technical Field of the Invention

The present invention relates to a cellular telecommunications system and, in particular, to the selective provision of telecommunications service based on the location of a specific directory number screening lists.

2. Description of Related Art

With the advent and development of mobile telecommunications systems, telecommunications users are no longer physically bound to wireline terminals or locations for telecommunications network communications. Using the added capabilities of roaming and interoffice handoffs, mobile subscribers may travel between multiple public land mobile networks (PLMN) utilizing the same telephone number and the same mobile station (MS) to originate outgoing calls and to receive incoming calls. Thus, a mobile subscriber may access telecommunications service from multiple locations utilizing multiple service providers with any incurred bills being charged to his own subscription. Furthermore, calling parties do not necessarily have to know where the mobile subscriber is physically located in order to properly route and to establish a speech connection. Data signals between Visiting Location Registers (VLRs) and a Home Location Register (HLR) automatically update and store subscriber information enabling the network to reroute incoming calls to the appropriate Mobile Switching Center (MSC) serving the roaming mobile subscriber.

However, such added mobility is not always desirable for a subscriber who has a subscription obligation with a service provider. Unlike wireline communications, cellular subscribers are responsible for charges incurred for both incoming and outgoing calls. Furthermore, because of the mobility provided by a mobile station itself, the subscriber owning the MS rarely has total control over his MS and its service. Therefore, if a MS is installed in a car, whoever is using the car has access to the MS and can charge to the subscriber's subscription. Furthermore, if the mobile subscriber is roaming outside of his home MSC area, he has no way of barring incoming long-distance calls and preventing unwanted charges.

A number of systems have been developed to block unwanted incoming calls and to deny unauthorized outgoing calls within a telecommunications system. The simplest implementation is a security system where users have to input a password or personal identification number (PIN) before being allowed to operate the mobile station and access the telecommunications service. This is overly restrictive because without the password, all incoming or outgoing calls, including emergency calls, are barred. Other more advanced and flexible systems are provided either by a module within a MS or servicing MSC where incoming or outgoing calls are selectively barred. Typically, incoming calls from or outgoing calls toward certain predefined telephone directory numbers are barred. Such barring could be based also on time. For example, during the day time, all outgoing long-distance calls from a wireline terminal may be barred. The subscriber may also wish to bar 900-series directory numbers permanently. However, most of these systems are inclusive rather than exclusive. Unless the system is instructed to bar a whole group of numbers, the system usually prevents service towards a limited set of numbers and allows the rest. On the other hand, because of expensive service charges, mobile subscribers are usually wanting to receive from or originate toward a limited set of directory numbers and to bar the rest.

Therefore, in those instances where it is possible to define barred destinations, the destinations are generally defined as destination types. Thus, many directory numbers are grouped into one destination type, such as:

normal subscribers connected to the same switch/
      network;
  special subscribers connected to the same switch (such as
      emergency numbers); and
  destination reached by trunks (long distance calls).

The current systems therefore imply that if a mobile subscriber is able to call one number within that group, it is difficult to prevent him from calling another number within the same group. Unfortunately, the above barring capabilities do not adequately serve mobile subscribers who want to have more strict and selective control over their subscriptions and telecommunications service in situations where the mobile station is roaming. For example, mobile subscribers might want to selectively control different types of access (i.e., different lists of directory numbers) for different MS locations. Another example might be, if a mobile station is being used by the subscription owner's children, the subscription owner might wish to bar all incoming and outgoing long distance calls. However, for emergency reasons, if the mobile station ever leaves the home area and roams into another MSC coverage area, the subscription owner might wish to allow long distance outgoing calls only toward the subscription owner's home directory number. This is because, if the children ever drive into another MSC coverage area, all outgoing calls toward wireline directory numbers associated with the home MSC area are now considered long distance calls. Therefore, even if the children wish to call home, such calls are barred by the previous long distance barring category. Such restrictions are disadvantageous and force the subscription owner to do away with the restriction in fear of emergency situations.

Another inadequate situation with the current system is when the mobile subscriber is within his home coverage area, he may wish to receive all incoming long distance calls. However, when he is roaming in another MSC coverage area, he may only wish to receive incoming long distance calls from a selected list of directory numbers. Such a list might include directory numbers representing his family and clients. If he is in one MSC area, he might wish to only accept incoming calls from a selected list of clients associated with that area. If he later roams into another MSC area, he might again wish to only accept incoming calls from another selected list of clients associated with that area. However, the current systems cannot provide different screening lists for different locations within a mobile telecommunications system.

Accordingly, it would be advantageous to provide a system where selective mobile telecommunications service is provided depending on the location of a mobile station and the directory number associated with the B-party (calling party for terminating calls, and called party for originating calls).

SUMMARY OF THE INVENTION

The present invention advantageously enables a mobile subscriber to selectively access and provide telecommunications service depending first on the current location of a mobile station, and subsequently on the directory number associated with the B-party.

An individual screening list containing a number of allowed directory numbers is assigned to a particular portion of the mobile telecommunications system service area. While the mobile subscriber is located within that particular service area portion, all incoming and outgoing calls are screened against the list. If the called or calling number matches a number on the list, the access to service is granted; otherwise, service is denied. If the mobile subscriber travels into a different service area portion, a different screening list is then used to screen all subsequent incoming and outgoing calls.

In one aspect, the present invention includes a method and apparatus for selectively screening incoming and outgoing calls for a mobile subscriber within a mobile telecommunications system wherein the screening is performed based first on the location of the mobile subscriber and then on the assigned screening list. Thus, a list of allowed directory numbers is stored and compared against a directory number associated with a call setup to determine whether the call setup should be allowed from that particular location of the mobile subscriber.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
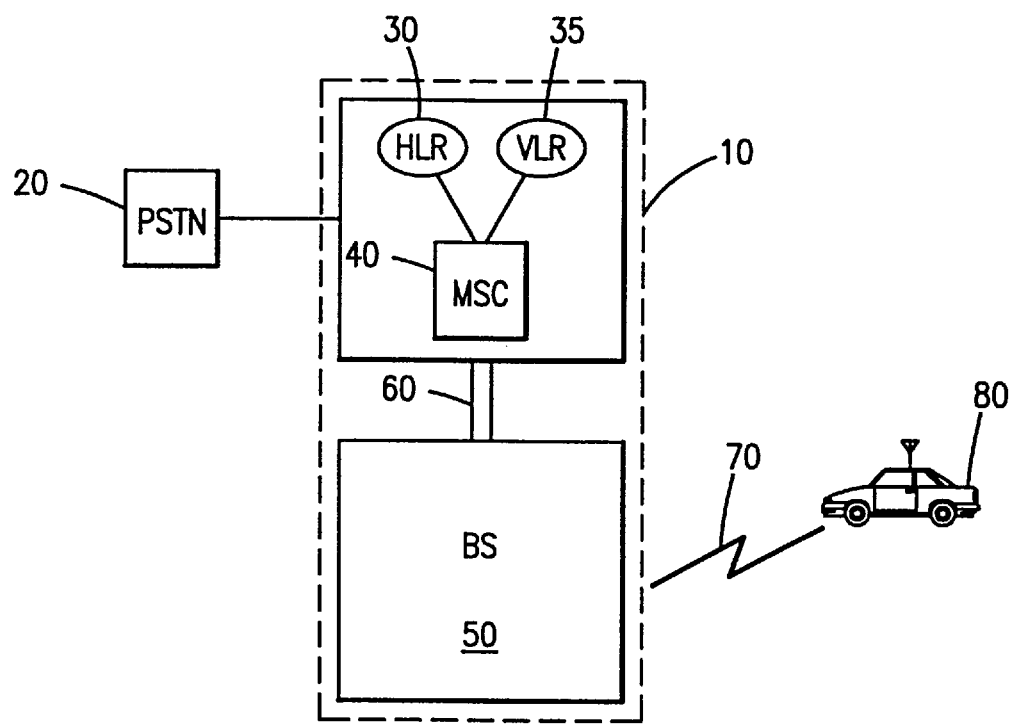
FIG. 1 is a diagram illustrating a public land mobile network (PLMN) interfacing with a mobile station (MS) and a public switched telephone network (PSTN)

FIG. 1 shows a public land mobile network (PLMN) 10 in which the present invention, as will be disclosed herein, may be implemented. The PLMN 10, which is used to communicate with a mobile user, comprises a Mobile Switching Center (MSC) 40, a home location register (HLR) 30, a visiting location register (VLR) 35, a base station (ES) 50, and a mobile station (MS) 80. The PLMN 10 is interfaced with a public switched telephone network (PSTN) 20 to provide a communication link to other telephone subscribers. The BS 50 is connected to the MSC 40 using a digital or analog communication link 60, and communicates with a mobile station 80 via a radio channel 70. The HLR 30 is a data base containing information about all "home" subscribers, their services and locations. The VLR 35 is a data base containing information about all "visiting" subscribers, their services and locations that are currently being served within this MSC 40 area. In large networks with high subscriber densities, HLRs 30 and VLR 35s are separate nodes. In small networks, they can be integrated in the MSC 40 as shown in FIG. 1.

The MSC 40 which contains a mobile station's subscription is labeled as the "home MSC0" for that mobile station. If the subscriber crosses the border to another MSC area during a conversation, an interexchange handoff will take place and the adjacent MSC, known as a "visited MSC," then handles the conversation—this process is known as "handover." If a foreign mobile subscriber travels into the MSC 40 area and turns on his MS unit, the VLR 35 communicates with a home HLR assigned to the foreign mobile subscriber to authenticate and verify telecommunications service and updates needed subscriber information from the home HLR to the VLR 35. The foreign mobile subscriber is then registered as a "roaming" subscriber and accordingly provided with telecommunications service— this process is also known as "roaming."

Such added mobility is not always desirable for a subscriber who has the subscription obligation with a service provider. Unlike wireline communications, mobile subscribers are responsible for charges incurred for both incoming and outgoing calls. Furthermore, because of the MS mobility, a local call can instantaneously and transparently become a long distance call should the MS travel out of his home MSC area. Furthermore, a mobile subscriber owning a MS rarely has total physical control over his MS. For example, if the MS is installed in a car, whoever is using the car has access to the MS. The mobile subscriber further has no effective way of barring an unwanted incoming long distance call.

A number of barring systems have been implemented in order to enable a mobile subscriber to block unwanted incoming calls and to deny unauthorized outgoing calls within a telecommunications system. However, the functions provided by the current systems are inclusive rather than exclusive. Therefore, unless the system is instructed to bar a whole group of numbers, the system usually prevents service towards a limited set of numbers and allows service towards the rest. On the other hand, because of expensive service charges and unwanted incoming long distance charges, mobile subscribers are usually wanting to do the reverse—mobile subscribers are usually wanting to receive from or originate toward a limited set of directory numbers and to bar the rest. Because of such differences, existing screening or barring systems do not adequately provide screening functions for mobile subscribers.

In accordance with the teachings of the present invention, instead of being limited to a single list of directory numbers, different lists of directory numbers are assigned to different locations within a mobile telecommunications system. As a result, if a MS roams into a first portion of the service area, a first list of directory numbers is used to screen incoming and outgoing calls. If the MS travels into a second portion of the service area, a second list of directory numbers is then used to screen different incoming and outgoing numbers. Therefore, all incoming and outgoing calls are first indexed using the current location of the MS, and appropriate directory numbers assigned to that location are then retrieved to screen the incoming and outgoing calls.

Such a selective call treatment further prevents and discourages mobile terminal cloning. If a mobile terminal is selectively programmed to receive or originate calls within a particular portion of the service area, an infringer with a cloned terminal cannot freely roam and originate international calls.

Figure 2:
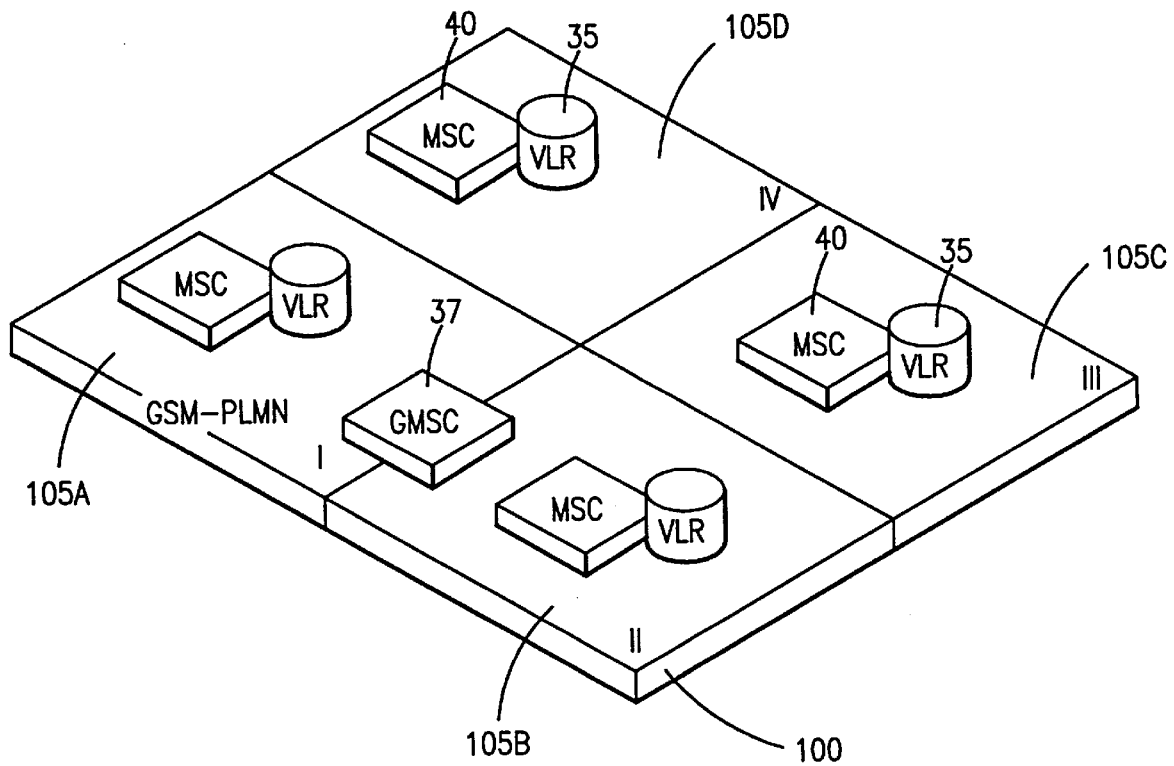
FIG. 2 is a diagram illustrating a single PLMN further comprising multiple Mobile Switching Center (MSC) areas.

Reference is now made to FIG. 2 where a layout of multiple MSC areas within a particular PLMN is illustrated. A PLMN network 100 is a complex configuration comprising multiple MSCs 40, VLRs 35, HLRs 30 (not shown in FIG. 2), Gateway MSC (GMSC) 37, etc. In order to properly switch a call to a MS located within a particular PLMN, the right entities need to be invoked and involved in a call process. It is therefore important to identify and address each one of the entities in the PLMN network 100 accurately and distinctively. In accordance with the teachings of the present inventions, these identifications and addresses are utilized to selectively assign different screening lists for a PLMN or for different locations within a PLMN. These lists of directory numbers are then utilized to selectively screen incoming and outgoing calls. A single list can be used to screen both incoming and outgoing calls, or separate lists can be assigned to incoming and outgoing calls. If the directory number associated with a B-party (calling party for terminating calls, and called party for originating calls) matches an entry in the screening list, telecommunications service is provided between the mobile subscriber and the B-party. On the other hand, if there is no match, the access is denied.

The PLMN 100 is also comprised of multiple MSC areas as illustrated by the MSC area 105A–105D. In order to narrow the geographical scope of a screening area, a screening list can be assigned to each one of the MSC areas 105. Each MSC area is served by a particular MSC 40 with an associated VLR 35 (HLR 30). A screening list can be associated with a particular MSC area, such as the MSC area 105D, wherein if the MS is within that MSC coverage area, that assigned screening list is utilized to screen incoming and outgoing calls. If the MS travels into a neighboring MSC area, such as the MSC area 105C, either a different screening list is utilized or the restriction is removed.

Figure 3:
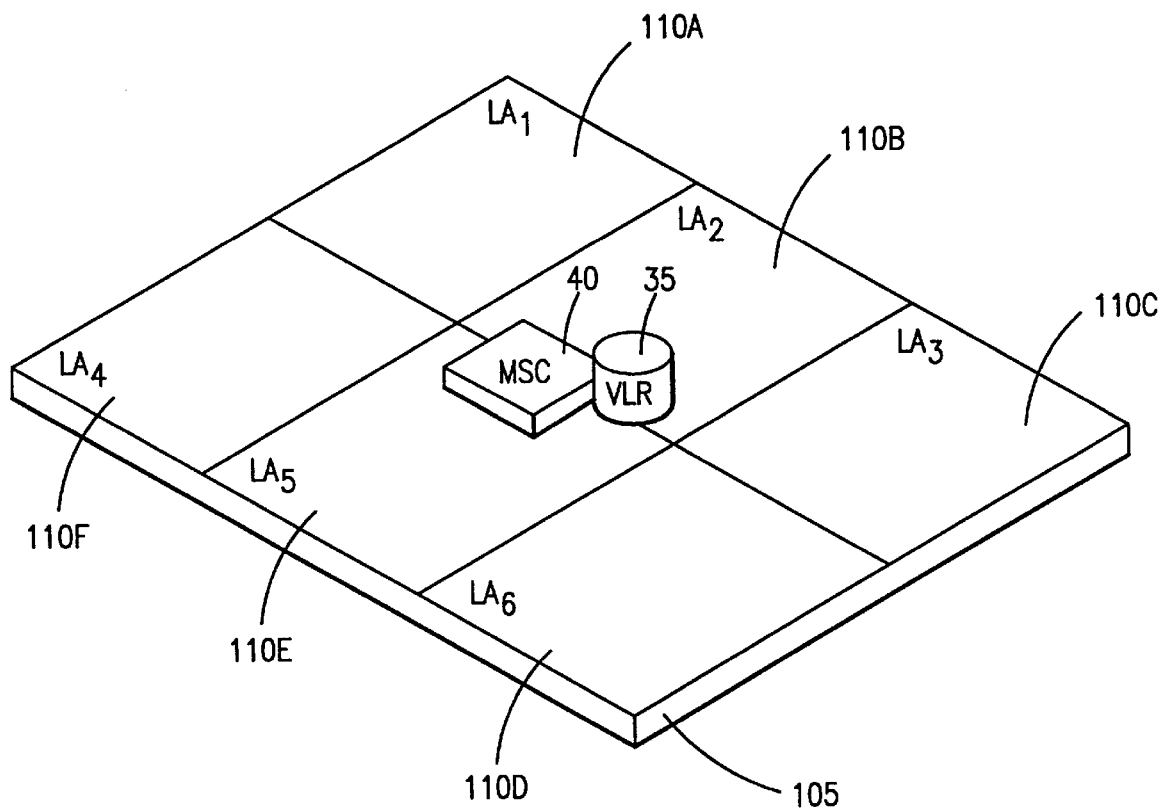
FIG. 3 is a diagram illustrating a single MSC further comprising multiple Local Areas (LA)

As another embodiment of the present invention, FIG. 3 illustrates multiple Location Areas 110A–110F within a particular MSC area 105. All of the Location Areas are served by the single MSC 40 and VLR 35. Different screening lists can be associated with each Local Area. Accordingly, if a MS is within the Location Area 110A, a first screening list is utilized. If the subscriber moves into a neighboring Location Area 110B, either a second screening list is utilized or the restriction is removed.

Figure 4:
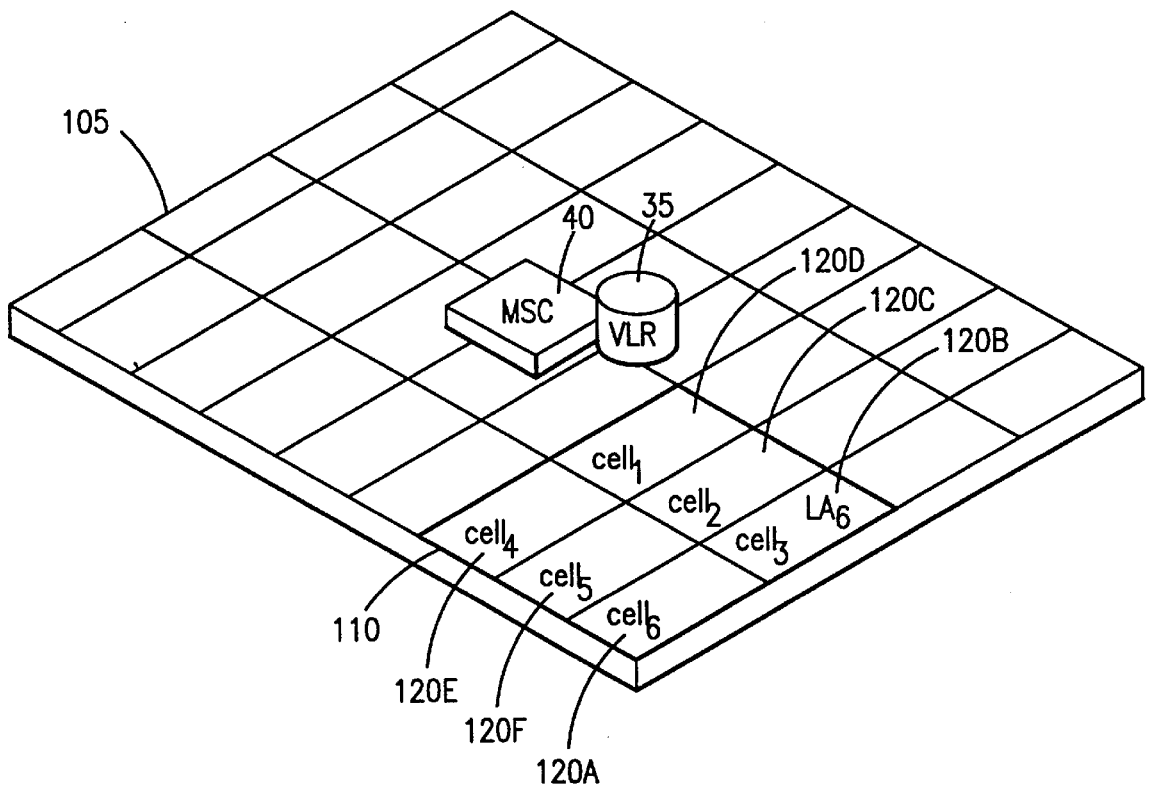
FIG. 4 is a diagram illustrating a single Local Area further comprising multiple Cell Areas.

Referring to FIG. 4, each Local Area 110 is further divided into multiple Cell Areas 120A–120F. Again, these Cell Areas within the Location Area 110 are served by the same MSC 40 and VLR 35. As yet another embodiment of the present invention, a screening list can be assigned to a particular Cell Area. This is especially useful for a business environment. Within a complex building environment, if an employee is given a mobile station to communicate over a telecommunications network while at work, but needs to be restricted from using the MS outside of his building premise (away from work), a screening list can be assigned to the cell serving the building premise. The employee is subsequently only allowed to receive or originate calls while he is physically within that Cell Area.

Figure 5:
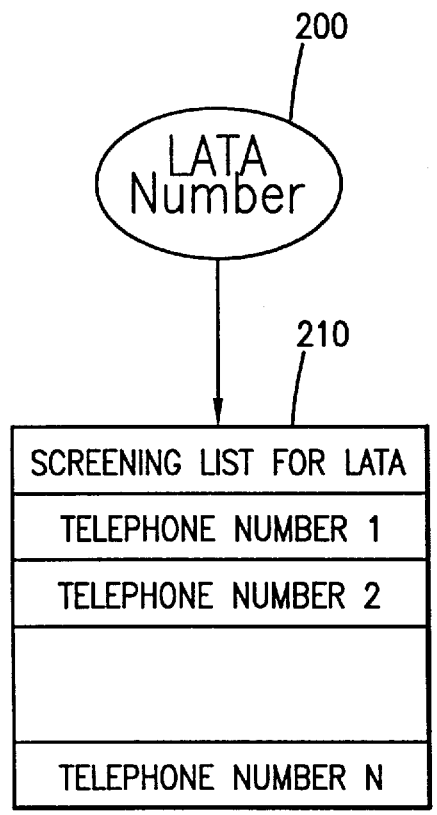
FIG. 5 is a diagram illustrating a memory element containing a selected list of directory numbers to be associated with a particular Local Access and Transport Area (LATA) number.

FIG. 5 is a diagram illustrating a data table 210 storing a number of telephone directory numbers to be screened for a particular LATA number 200. As mentioned previously, this single list can be utilized for both incoming and outgoing calls, or separate lists can be utilized separately for incoming and outgoing calls. A LATA Number 200 is currently being used to identify a Local Access Transport Area within a nation-wide telecommunications system. By assigning a desired screening list with a particular LATA Number, a mobile subscriber is screened accordingly while he is within that Local Access Transport Area.

Figure 6:
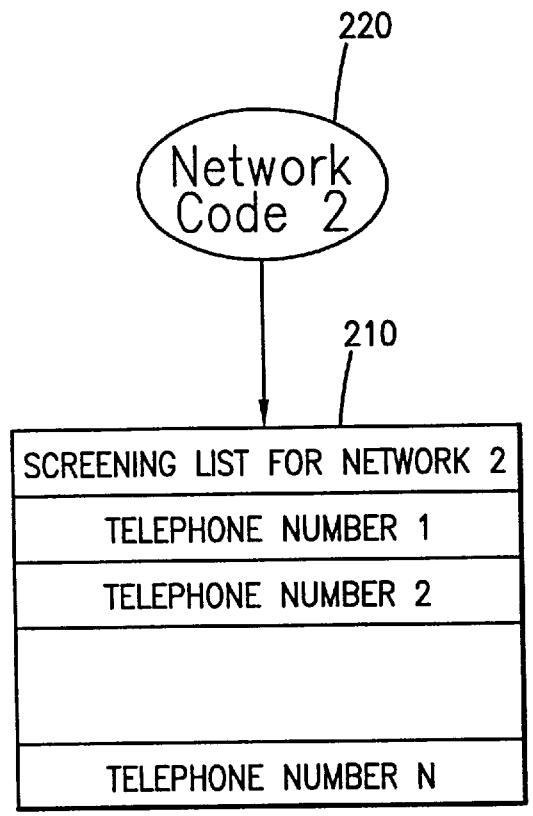
FIG. 6 is a diagram illustrating a memory element containing a selected list of directory numbers to be associated with a Network Code (NC) number.

FIG. 6 illustrates a data table 210 storing a number of directory numbers to be screened for a particular Network Code number 220. A Network Code number 220 is currently being used to identify a particular PLMN within a country or area-code area. By assigning a screening list table 210 to a particular Network Code, as illustrated in FIG. 2, telecommunications service for a mobile subscriber is screened in accordance with the assigned screening list as long as the mobile subscriber is within the PLMN area 100.

A PLMN number is part of an International Mobile Subscriber Identity (IMSI) number. The IMSI is the information which uniquely identifies a subscriber within a cellular telecommunications network and comprises:

IMSI=Mobile Country Code (MCC)+

Mobile Network Code (MNC)+

Mobile Subscriber Identification Number (MSIN).

A Network Number representing a particular PLMN comprises MCC and MNC values. Accordingly, by assigning a screening list to a particular MCC+MNC number, all IMSI numbers containing the specified PLMN number are screened-against the above screening list 210.

Figure 7:
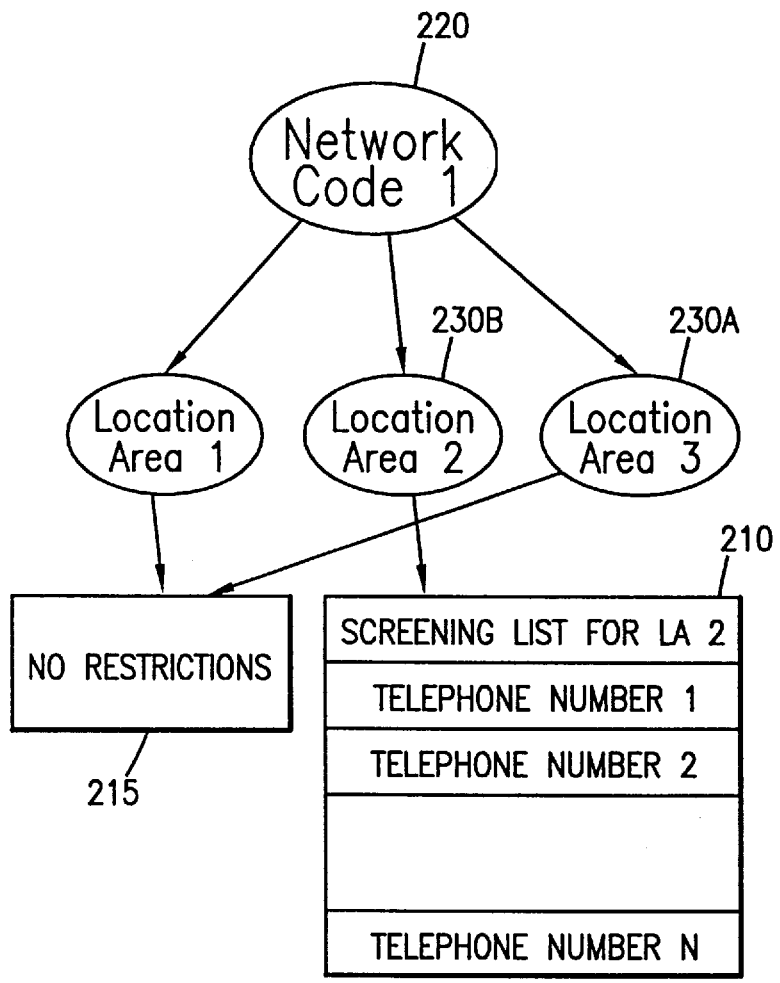
FIG. 7 is a diagram illustrating a memory element containing a selected list of directory numbers to be associated with a Location Area (LA) number.

FIG. 7 illustrates a more restrictive screening area by assigning a screening list table 210 to a particular Location Area within a Network Area (see, FIG. 3). A certain Location Area can be assigned a screening list while others are serviced without any restriction as shown by the no restriction category 215.

A particular location area within a particular network is identified by the Local Area Identity (LAI) number. A LAI number comprises:

MCC+MNC+LAC.

Therefore, the first two numbers designate a particular network (PLMN) within a mobile telecommunications system, and the last LAC number designates the screening Location Area within that network. Accordingly, by assigning a screening list to a particular MCC+MNC+LAC number, all mobile calls containing the specified LAI numbers are screened against the above screening list 210.

Figure 8:
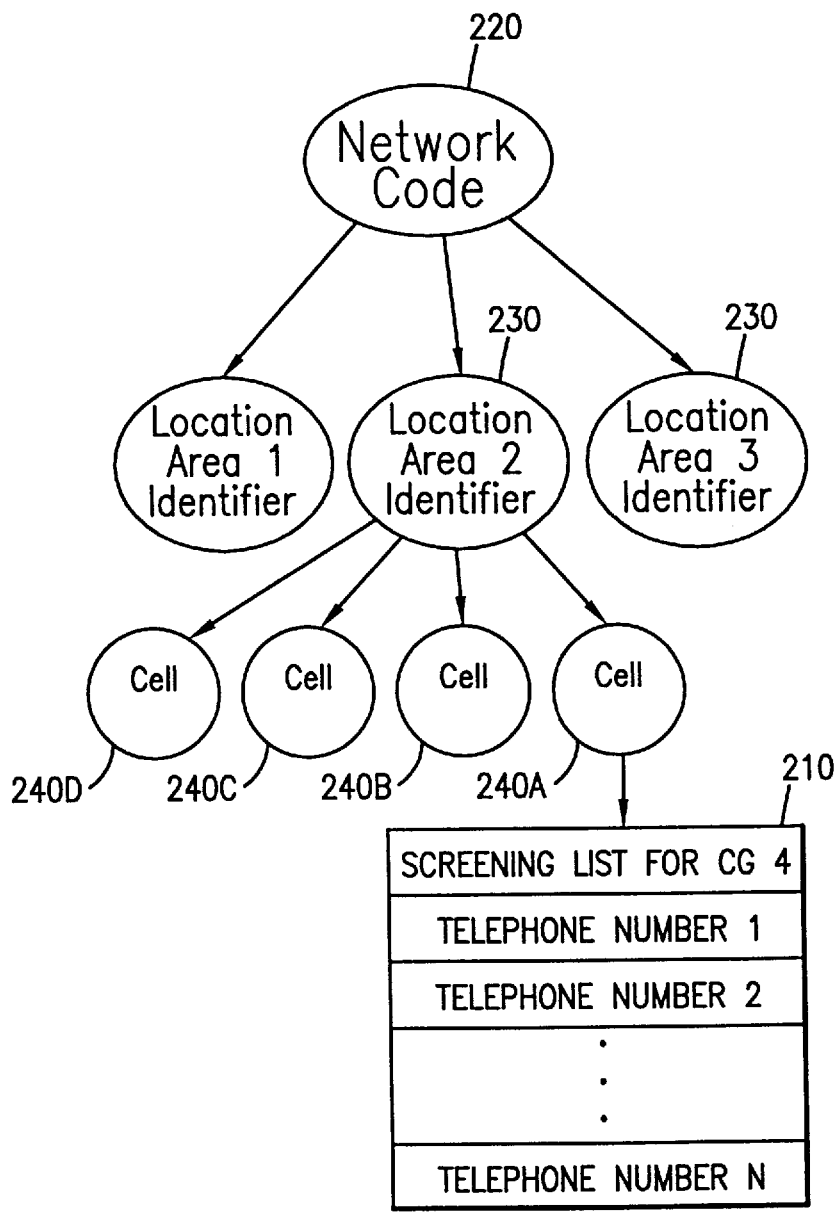
FIG. 8 is a diagram illustrating a memory element containing a selected list of directory numbers to be associated with a Cell Identity (CI) number.

Referring to FIG. 8 where there is shown a screening list table 210 storing a number of directory numbers to be screened for a Cell Area 240A. As also shown in FIG. 4, a single Local Area 230 is comprised of multiple Cell Areas 240A–240D. By assigning a screening list 210 to a particular Cell Area 240, telecommunications service to a particular MS is screened in accordance with the assigned screening list while the MS is within the selected Cell Area (see, FIG. 4).

A particular Cell Area within a particular Location Area is represented by a Cell Global Identity (CGI) number. The CGI number comprises:

MCC+MNC+LAC+CI.

The first two numbers represent a particular network number. The LAC number, as previously described, represents a particular Location Area 230 within that network. Lastly, the CI number specifies a particular Cell Area 240B within that Location Area. Accordingly, by appending all of the four unique numbers, a CGI number representing a unique Cell Area is identified. Accordingly, by assigning a screening list to this unique CGI number, all calls comprising this CGI number are identified and screened.

Figure 9:
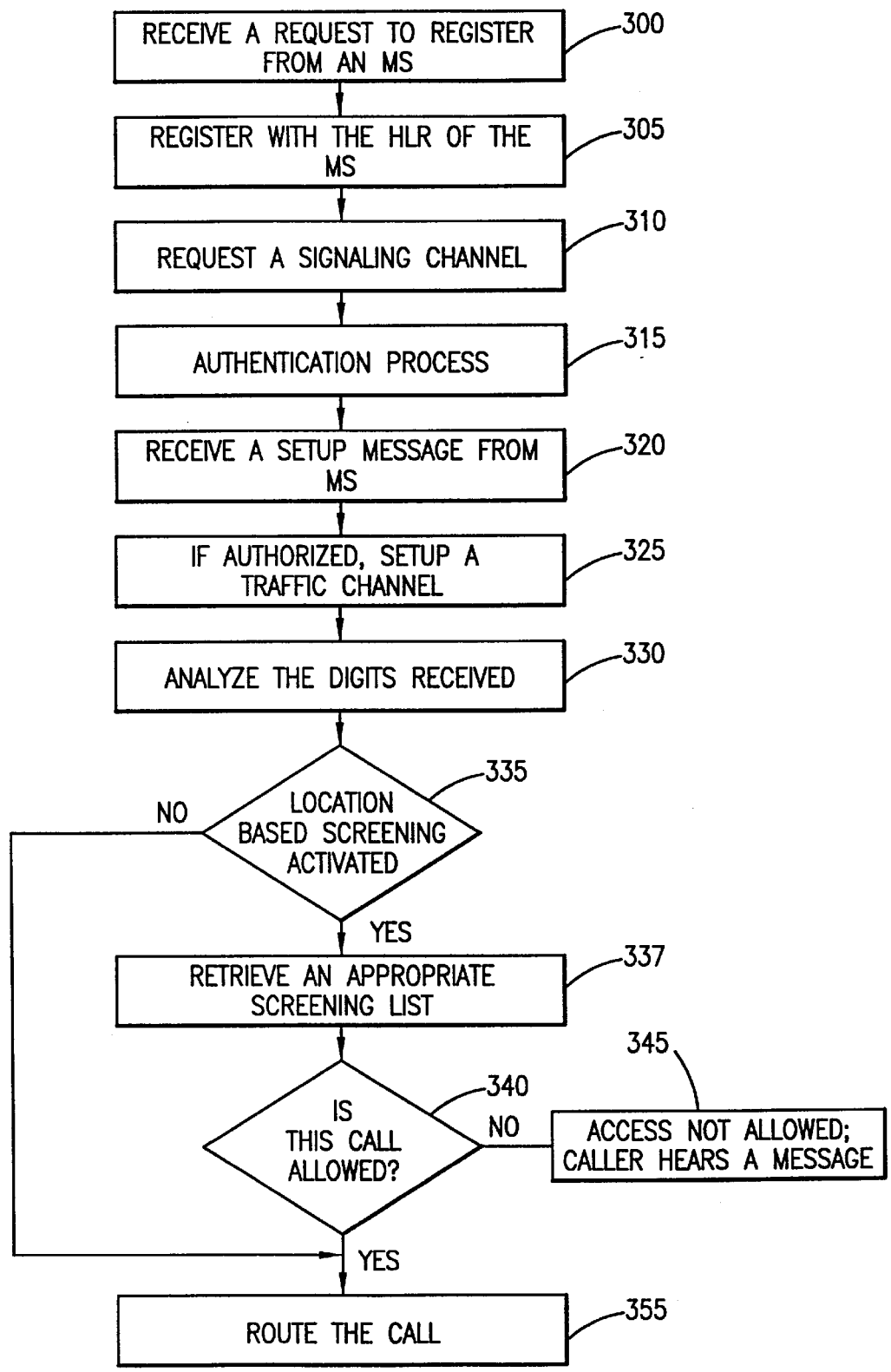
FIG. 9 is a flowchart illustrating the steps of screening an originating call in accordance with the teachings of the present invention.

FIG. 9 is a flowchart illustrating the steps of screening an originating call from a mobile subscriber roaming within a particular location. A roaming subscriber is used to illustrate the screening function in accordance with the teachings of the present invention. However, as the system and method of the present invention are applicable to any termination or originating calls toward a MS located anywhere in a mobile telecommunications system, it will be understood that the description of the present invention in the context of a roaming MS provided herein is by way of explanation of the invention rather than by way of limitation of the scope of the invention.

A number of steps are involved in a call which is originated from a mobile station. Some preconditions must have already been met, such as registration of the mobile within the PLMN and the HLR/VLR of that MSC (step 300). For a roaming mobile subscriber, after a MS requests telecommunications service from a serving exchange, the serving exchange for that particular area, in turn, communicates with the home MSC to confirm that the MS has access and permission to use the telecommunications services at step 305. Next, the MS requests a signaling channel with which to communicate with the network at step 310. The HLR/VLR analyzes the identity of the mobile station and marks that mobile station as busy in the HLR/VLR. Authentication may be performed at this stage at step 315. Location updating and ciphering may also be initiated at this point. The mobile station now sends a setup message which states what kind of service is being requested and, in the case of call establishment, the number which the subscriber wishes to call at step 320. If the subscriber is authorized to originate calls, the call setup proceeds by the establishment of a link between the MSC and the BSC, and the allocation of a traffic channel for the call at step 325. Assuming there is an available idle traffic channel, the BSC will order the BTS (base station) to activate this channel. Once the channel is activated, the BTS acknowledges the order to the BSC, and the BSC in turn informs the MSC. The MSC then informs the MS that the channel assignment has been performed. At this point in the call, there is a channel open from the MSC/VLR to the MS, but no call has been established to the destination pointed out by the digits. Typically, these digits are now analyzed which will lead to the pointing out of, for instance, a trunk to another exchange, another mobile connected within the same MSC/VLR, etc., at step 330. However, before the actual routing is initiated, it is determined whether the mobile subscriber currently has the location based screening function activated at step 335. If the location based screening function is activated, based on the location determination made at step 315, an assigned screening list is retrieved at step 337. In retrieving the screening list, a further determination needs to be made in order to ascertain the appropriate list. For example, a MS might not have any screening list assigned to a Network Area but might have a screening list assigned to one of the Location Areas within that network. If an appropriate screening list is not found for that Network Area, a further determination is needed to ascertain if there exists a screening list for a sub-area. Furthermore, a MS might have a first screening list assigned to a particular Network Area. However, if he further has a different screening list for one of the Local Areas within that particular Network Area, even after finding an appropriate screening list for the Network Area, a further determination is needed to ensure that a more restrictive list does not exist. Otherwise, a more restrictive list must be utilized for that particular Location Area.

After retrieving the most appropriate screening list, a comparison is now made at this time to determine whether the dialed digits are one of the allowed entries in the screening list (step 340). If there is no match, for this particular location, the dialed directory number is not allowed to be originated and an appropriate denial message is sent to the MS at step 345. On the other hand, if there is a match between one of the entries in the screening list and the dialed directory number, the routing of the originating call is initiated at step 355.

Figure 10:
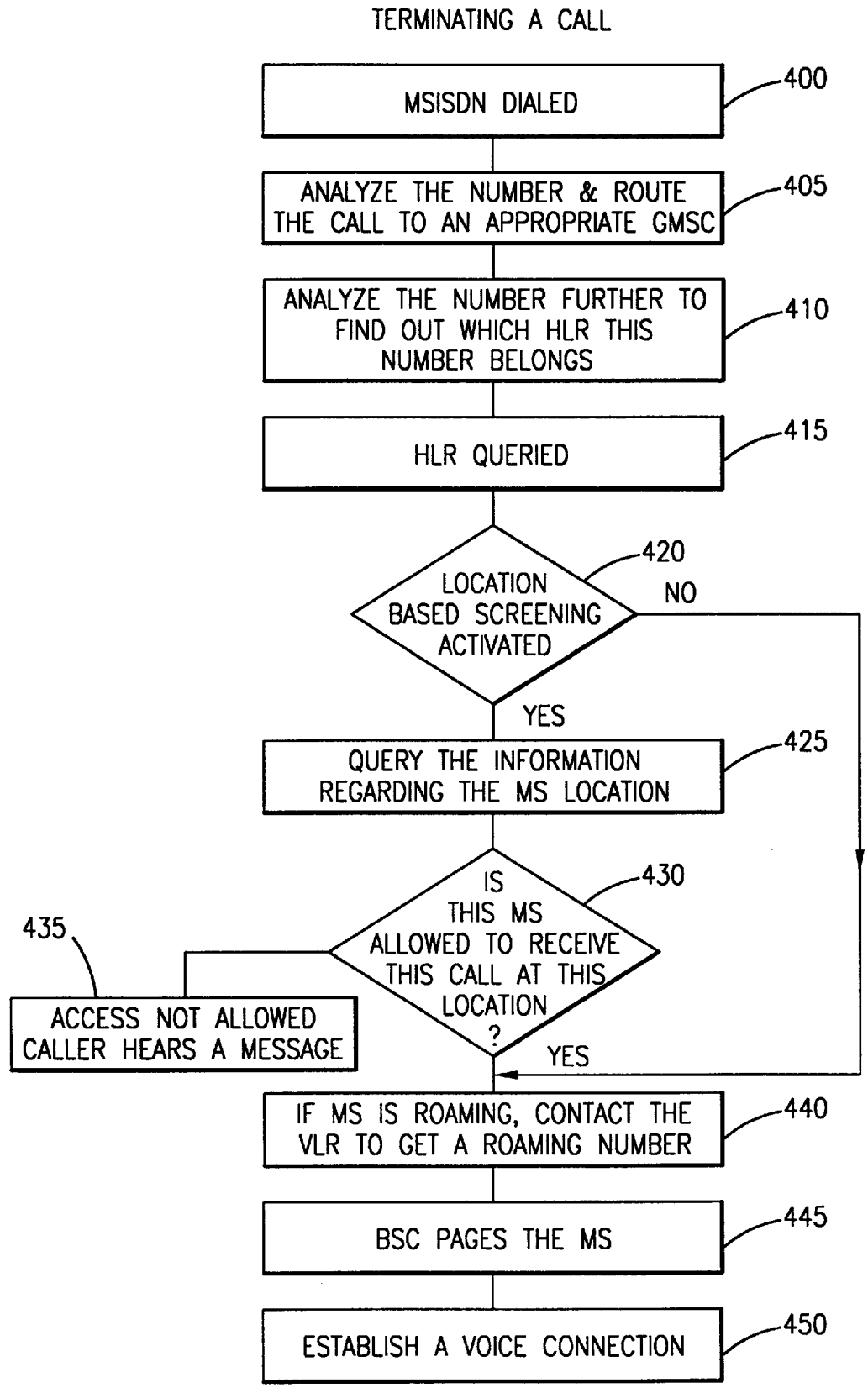
FIG. 10 is a flowchart illustrating the steps of screening a terminating call in accordance with the teachings of the present invention.

FIG. 10 is a flowchart illustrating the steps of screening a terminating call toward a mobile subscriber roaming within a particular MSC area. The most obvious distinguishing component of a terminating call to a mobile station from a wire-line terminal is the fact that the network where the call originates does not know where the mobile station is physically located. The number which is dialed at step 400 to reach a mobile station is called the Mobile Station Integrated Service Digital Network (MSISDN) number. The exchange where the call originates analyzes the number (or part of the number) and routes the call to a GMSC belonging to the PLMN which is pointed out as the "owner" of the subscription associated with the MSISDN number at step 405. This GMSC, in-turn, analyzes the number in order to find out to which HLR this number belongs. The GMSC then queries the HLR in order to find out how, or if, the call should be routed at step 410. The HLR uses the MSISDN number to find the associated International Mobile Subscriber Identifier (IMSI) which is a number only used within the signaling network. At the same time, the HLR finds the data associated with the subscription as well as the location information which has been sent by the VLR currently serving the mobile station at step 415. It is then determined whether the MS has the location based screening function activated at step 420. If the screening function is activated, an appropriate screening list is retrieved for this particular location at step 425. A comparison is then made to determine whether the directory number associated the calling party is one of the entries in the screening list at step 430. If the directory number is not found within the list, a connection to the MS is not allowed and an appropriate denial message is sent to the calling party at step 435. However, if there is a match, the HLR then contacts the VLR in order to get a roaming number at step 440. This roaming number is the number which can be used by the GMSC to, reroute the call from the GMSC to the MS currently servicing the mobile station. Once the call arrives at the MSC/VLR, the MSC consults its own data records in order to determine in which location area the subscriber is located. (If this Location Area was not available to the home MSC, a further comparison is made to screen the terminating call.) The MSC then orders paging of the mobile station via the BSC associated with that location area at step 445. The BSC, in turn, orders the appropriate BTSs to perform paging and to establish a speech connection with the roaming MS at step 450.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for selectively screening incoming and outgoing calls for a mobile subscriber within a cellular telecommunications system, said method comprising the steps of:

receiving a call setup request to establish a connection between said mobile subscriber and a telecommunications party, said telecommunications party having an associated directory number;

determining a current location of said mobile subscriber;

determining whether said directory number is an entry within an individualized screening list associated with said current location for said mobile subscriber; and processing said call setup request in response to said step of determining.

2. The method of claim 1 wherein said step of receiving a call setup request further comprises the step of receiving an originating call setup request from said mobile subscriber toward said telecommunications party.

3. The method of claim 2 wherein said step of processing said call setup request further comprises the steps of:

processing said originating call setup request if said directory number is included as one of the entries within said screening list for said mobile subscriber; otherwise, generating a denial message to said mobile subscriber.

4. The method of claim 1 wherein said step of receiving a call setup request further comprises the step of receiving a termination call request from said telecommunications party to said mobile subscriber.

5. The method of claim 4 wherein said step of processing said call setup request further comprises the steps of:

processing said terminating call request by alerting said mobile subscriber and establishing a speech connection if said directory number is included as one of the entries within said screening list; otherwise, generating a denial message to said telecommunications party.

6. The method of claim 1 wherein said step of determining the current location of said mobile subscriber further comprises the step of determining a Local Access and Transport Area (LATA) where said mobile subscriber is currently located.

7. The method of claim 1 wherein said step of determining said current location of said mobile subscriber further comprises the step of determining a Network Area where said mobile subscriber is currently located.

8. The method of claim 1 wherein said step of determining said current location of said mobile subscriber further comprises the step of determining a Location Area where said mobile subscriber is currently located.

9. The method of claim 1 wherein said step of determining said current location of said mobile subscriber further comprises the step of determining a Cell Area where said mobile subscriber is currently located.

10. A system for selectively screening incoming and outgoing calls for a mobile subscriber within a cellular telecommunications system, said system comprising:

means for receiving a call setup request to establish a connection between said mobile subscriber and a telecommunications party, said telecommunications party having an associated directory number;

means for determining a current location of said mobile subscriber;

means for determining whether said directory number is an entry within an individualized screening list associated with said current location for said mobile subscriber; and means for processing said call setup request in response to said determining means.

11. The system of claim 10 wherein said means for receiving said call setup request further comprises the means for receiving an originating call setup request from said mobile subscriber toward said telecommunications party.

12. The system of claim 11 wherein said means for processing said call setup request further comprises:

means for processing said originating call setup request if said directory number is included as one of the entries within said screening list for said mobile subscriber; otherwise, means for generating a denial message to said mobile subscriber.

13. The system of claim 10 wherein said means for receiving a call setup request further comprises the means for receiving a termination call request from said telecommunications party to said mobile subscriber.

14. The system of claim 13 wherein said means for processing said call setup request further comprises:

means for processing said terminating call request by alerting said mobile subscriber and establishing a speech connection if said directory number is included as one of the entries within said screening list otherwise, means for generating a denial message to said telecommunications party.

15. The system of claim 10 wherein said means for determining the current location of said mobile subscriber further comprises the means for determining a Local Access and Transport Area (LATA) where said mobile subscriber is currently located.

16. The system of claim 10 wherein said means for determining said current location of said mobile subscriber further comprises the means for determining a Network Area where said mobile subscriber is currently located.

17. The system of claim 10 wherein said means for determining said current location of said mobile subscriber further comprises the means for determining a Location Area where said mobile subscriber is currently located.

18. The system of claim 10 wherein said means for determining said current location of said mobile subscriber further comprises the means for determining a Cell Area where said mobile subscriber is currently located.

19. A method of selectively treating a call setup request between a mobile subscriber and a telecommunications party within a mobile telecommunications network, said network comprising a number of service areas, said method comprising the steps of:

associating a register containing a screening list with one of said service areas;

receiving a call setup request to establish a connection between said mobile subscriber and said telecommunications party;

determining if a directory number associated with said telecommunications party is an entry within said register if said mobile subscriber is within said one of said service areas; and selectively treating said call setup request in response to said determination.

20. The method of claim 19 wherein said step of associating said register further comprises the step of associating said register with one of said service areas representing a Local Access and Transport Area (LATA).

21. The method of claim 19 wherein said step of associating said register further comprises the step of associating said register with one of said service areas representing a Network Area.

22. The method of claim 19 wherein said step of associating said register further comprises the step of associating said register with one of said service areas representing a Location Area.

23. The method of claim 19 wherein said step of associating said register further comprises the step of associating said register with one of said service areas representing a Cell Area.

24. The method of claim 19 wherein said step of selectively treating said call setup request further comprises the steps of:

processing said call setup request if there is a match; otherwise, denying said call setup request.

25. The method of claim 19 wherein said step of receiving said call setup request further comprises the step of receiving a terminating call setup request from said telecommunications party toward said mobile subscriber.

26. The method of claim 19 wherein said step of receiving said call setup request further comprises the step of receiving an originating call setup request from said mobile subscriber toward said telecommunications party.

* * * * *